Jan. 24, 1950   G. C. BEATRICE   2,495,503
LOOM PICKING MECHANISM AND SHAFT THEREFOR
Filed July 3, 1948
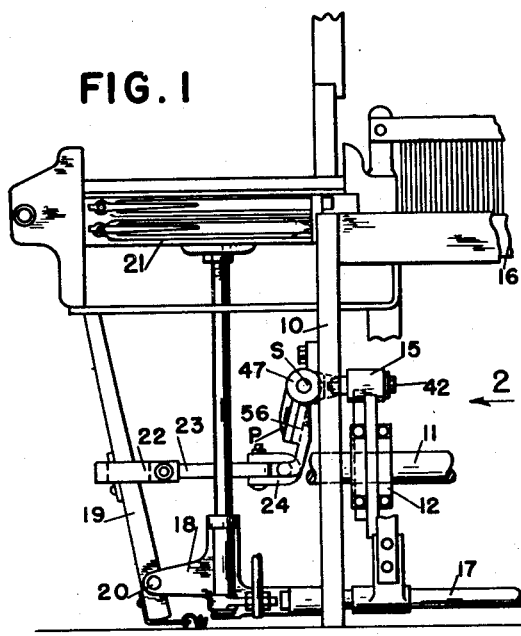
FIG. 1
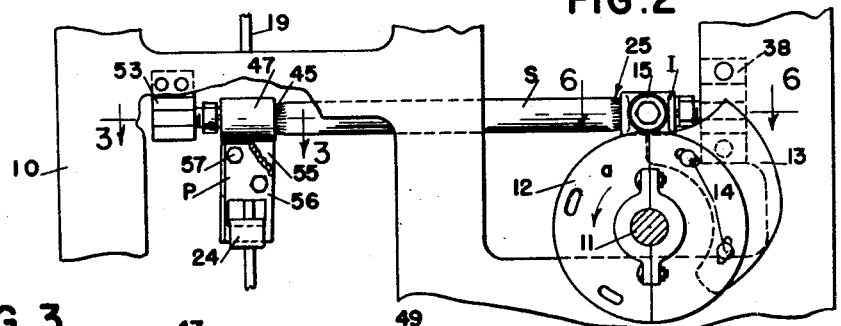
FIG. 2
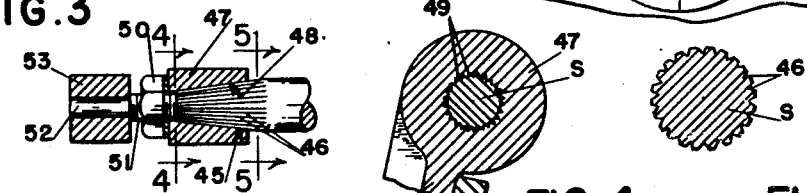
FIG. 3   FIG. 4   FIG. 5
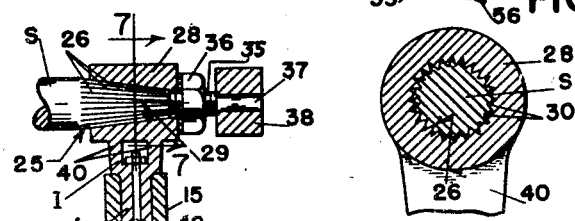
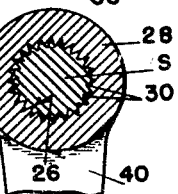
FIG. 6   FIG. 7
INVENTOR
GABRIEL C. BEATRICE
Chas. T. Hawley
ATTORNEY Patented Jan. 24, 1950

2,495,503

UNITED STATES PATENT OFFICE 2,495,503

LOOM PICKING MECHANISM AND SHAFT THEREFOR

Gabriel C. Beatrice, Shrewsbury, Mass., assignor to Crompton & Knowles Loom Works, Worcester, Mass., a corporation of Massachusetts Application July 3, 1948, Serial No. 36,930

7 Claims. (Cl. 139—147)

This invention relates to improvements in picking mechanisms for looms and it is the general object of the invention to provide a picking shaft constructed in such manner as to hold the picking power arm and the power input member to the shaft by means which permit angular adjustment of these parts on the shaft.

Certain types of picking mechanism employ a rocking shaft having power or force transmitting elements thereon one of which is a power arm for connection to the picker stick and the other end of which is some form of power input member actuated by the loom. It is desirable that provision be made for adjusting these transmitting elements angularly on the shaft. In the past this adjustment on round shafts has been made by means of set screws which do not hold their setting under repeated operations of the picking mechanism. In other instances where the picker shaft is of rectangular form the members are held firmly against angular movement, but are not angularly adjustable.

It is an important object of the present invention to provide a picker shaft having a conical part provided with a plurality of slots or grooves arranged peripherally thereon to receive splines on the hub of a power arm or power input member.

It is another object of the invention to provide the picker shaft with conical surfaces to engage conical surfaces on the aforesaid hubs, and provide the shaft with screw threads or the like for the reception of a tightening nut which will hold the complementarily formed conical surfaces of the shaft and hub in tight engagement with each other.

With these and other objects in view which will appear as the description proceeds, the invention resides in the combination and arrangement of parts hereinafter described and set forth.

In the accompanying drawings, wherein a convenient embodiment of the invention is set forth, Fig. 1 is a front elevation of one end of a loom having the invention applied thereto, Fig. 2 is a side elevation of certain parts of a picking mechanism looking in the direction of arrow 2, Fig. 1, Fig. 3 is an enlarged horizontal longitudinal section on line 3—3 of Fig. 2, Figs. 4 and 5 are enlarged vertical transverse sections on lines 4—4 and 5—5, respectively, of Fig. 3, Fig. 6 is an enlarged horizontal longitudinal section on line 6—6 of Fig. 2, and Fig. 7 is an enlarged transverse vertical section on line 7—7 of Fig. 6.

Referring particularly to Fig. 1, the loom frame 10 supports a bottom shaft 11 driven in any approved manner to rotate preferably once every other pick of the loom. Secured to the shaft is a picking actuator shown as cam 12 having a cam tappet 13 secured thereto as at 14. The tappet 13 engages a picking roll 15 mounted on the picking shaft designated generally at S.

The loom is also provided with a lay 16 swinging about a rocker shaft 17 to the left end of which as viewed in Fig. 1 is secured a rocker iron 18. A picker stick 19 is pivoted to the rocker iron at 20 and extends upwardly to have operative engagement with a shuttle in the shifting shuttle boxes designated at 21.

The picker stick is operated by means of a lug strap 22 secured to a sweep stick 23 and a power strap 24 secured to the latter. Whenever the cam tappet 13, which turns in a counterclockwise direction as viewed in Fig. 2, engages the roll 15 the shaft S will be rocked in a counterclockwise direction as viewed in Fig. 1 to cause movement of the picker stick 19 to the right by connections including the power strap 24 and parts on the shaft S to be described in detail hereinafter.

The matter thus far described is of common construction and is known in the weaving industry as a cone pick, but it is to be understood that the invention is not necessarily limited to this type of picking mechanism.

In carrying the invention into effect the shaft S is provided with conical portions or members near the front and back ends thereof to receive complementarily formed hubs, one for the roll 15 and the other for the power strap 24. Referring more particularly to Figs. 6 and 7 the rear part of the shaft has fixed thereto a conical portion or member 25 provided with a plurality of grooves or slots 26 which are distributed peripherally and uniformly around the portion 25. A power input member I has a hub member 28 formed with an internal conical bore or surface 29 complementing the conical surface of portion 25 and formed with a number of ridges or splines 30 to fit the slots 26. The splines and slots form interengaging means distributed around the axis of the shaft to prevent relative angular movement of the conical member and hub for any of their angular adjustments.

That end of the shaft S extending to the right of conical member 25 is provided with screw threads 35 on which is threaded a holding nut 36 which when turned up tight forces the hub 28 onto the member 25 to establish tight holding relation between the splines 30 and the slots 26. The screw and nut constitute convenient cooperating means to hold the conical parts together, but the invention is not limited to such means. The right end of the shaft as viewed in Fig. 6 is provided with a gudgeon 37 received by a bearing 38 mounted on the loom frame. By loosening the nut 36 and moving the hub 28 to the right as viewed in Fig. 6 the angular position of the hub can be changed with respect to the conical portion 25, after which the nut 36 can be tightened to hold the new angular setting of the hub and shaft.

The power input member has the aforesaid roll 15 mounted thereon as indicated in Fig. 6. To effect this mounting a pair of arms 40 may extend laterally from the hub 28 and be joined by a cross head 41 which carries a stud 42 to provide a rotatable mounting for the roll 15.

The forward end of the shaft, the left end thereof as viewed in Fig. 2, is formed similarly to the rear end and is provided with a conical portion or member 45 provided with slots 46. The power arm P has a hub 47 formed with an internal conical surface 48 having splines 49 to enter the slots 46. A holding screw 50 similar to screw 36 is threaded on screw threads 51 cut on the shaft and serves the purpose of holding the hub 47 in tight holding relation with respect to the member 45. The forward end of the shaft is provided with a gudgeon 52 received by a bearing 53 mounted on a loom. Angular adjustment of the hub 47 with respect to the member 45 may be effected in a manner similar to that described for the adjustment of hub 28 relative to member 25.

The hub 47 has integral therewith a depending arm 55 which supports a strap actuator 56 bolted thereto as at 57. The hub 47, arm 55, and the strap actuator 56 together constitute the power arm P which is operatively connected to the power strap 24.

In operation, rotation of the bottom shaft 11 in the direction of arrow $a$ causes the cam tappet 13 to raise the picking roll 15 and thereby rock the shaft S to effect a picking operation of the picker stick 19. During the picking operation the cam tappet 13 not only raises the roll but also exerts thereon a force parallel to the shaft which has the effect of forcing the conical surface 29 of the hub 28 against the conical portion 25. This tends to preserve the tight holding connection between the hub 28 and the shaft.

In the practical application of the invention the conical portions 25 and 45 may be made as separate parts and welded or otherwise secured to the shaft. In any event these portions will be rigid with the shaft to cause operation of the power arm when the power input member is actuated by the cam or picking actuator 13.

From the foregoing it will be seen that I have provided simple means for holding the power arm and the power input member in fixed positions on the picking shaft by means which permit angular adjustment of these parts relatively to the shaft. The shaft near each end thereof is preferably formed with an external conical surface which fits an internal conical surface in a hub. The conical surfaces are preferably coaxial with the shaft and are held together by a holding nut or the like. While the invention has been shown as applied to both ends of the shaft it is not necessarily thus employed, since the conical connection can be used for only one of the attachments on the shaft if desired. The power input member and the power arm may both be considered power transmitting elements since they act to pass power derived from the picking cam on to the picker stick.

Having thus described the invention it will be seen that changes and modifications of the foregoing specific disclosure may be made without departing from the spirit and scope of the invention.

What is claimed as new is:

1. In a picking shaft for a loom having a bearing, a gudgeon on one end of the shaft for said bearing, a screw thread on the shaft extending from the gudgeon toward the longitudinal center of the shaft, a conical member formed on the shaft, a hub member having a conical bore fitting the conical member, interengaging splines and slots on said members distributed around the axis of the shaft, the small end of the conical member being adjacent to the screw threads, a nut on the latter forcing the splines into the slots to hold said members together tightly, and a power transmitting element on the hub.

2. In a picking shaft for a loom having a bearing, a gudgeon on one end of the shaft for said bearing, a conical portion on the shaft spaced from the gudgeon and having the small end thereof facing said gudgeon, a screw thread on the shaft between the gudgeon and conical portion, a power transmitting element having a conical bore fitting the conical portion, a nut on the screw thread forcing the conical bore into tight holding relationship with said conical portion, and means on the latter and bore distributed around the axis of the shaft preventing relative angular movement of the element and shaft.

3. In a picking shaft for a loom having a bearing, a gudgeon on one end of the shaft for said bearing, a conical portion on the shaft spaced from the gudgeon and having the small end thereof facing said gudgeon, a power transmitting element on the shaft having a conical bore fitting the conical portion, cooperating means between the gudgeon and conical portion forcing the conical bore into tight holding relation with the conical portion, and interengaging means formed partly on the conical portion and partly on the element capable of assuming a plurality of relative angular positions in each of which said interengaging means is effective to prevent relative angular movement of the element and shaft.

4. In a picking shaft for a loom having a bearing, a gudgeon on one end of the shaft for said bearing, a conical portion on the shaft spaced from the gudgeon and having the small end thereof facing said gudgeon, a power transmitting element on the shaft having a conical bore fitting the conical portion, cooperating means between the gudgeon and conical portion forcing the conical bore into tight holding relation with the conical portion, a plurality of splines on the element distributed uniformly around the periphery of the conical bore, and a plurality of slots distributed uniformly around the periphery of the conical portion to fit said splines in any angular position of the conical portion with respect to said element.

5. In picking mechanism for a loom having front and back bearings, a picking shaft rockably mounted in said bearings, a picking actuator, a power input member on the shaft for operation by the picking actuator, the latter during the picking operation exerting a force on the power input member directed toward the longitudinal center of the shaft, and operative connections between the power input member and the shaft comprising a conical portion on the shaft engaging a conical surface on the input member, the larger diameter of said conical portion being at that end thereof nearer the longitudinal center of the shaft.

6. In picking mechanism for a loom having front and back bearings and a picking actuator, a picking shaft rockably mounted in said bearings, a power input member on said shaft for operation by said picking actuator, the latter during a picking operation exerting on said input member a force directed toward the longitudinal center of the shaft, means on the shaft having a conical surface coaxial with the shaft, a bore in the input member having a conical surface fitting said conical surface on said means, the larger diameters of said conical surfaces being at that end thereof nearer to the longitudinal center of the shaft, and inter-engaging splines and slots formed on said conical surfaces to prevent relative angular movement of the input member with respect to the shaft.

7. A picking shaft for a loom having spaced bearings, gudgeons at the ends of the shaft for said bearings, a pair of conical portions on the shaft adjacent to but spaced from said gudgeons, said conical portions having their larger diameters at the ends thereof nearer the longitudinal center of the shaft, a pair of power transmitting elements, one for each conical portion, each element having a conical bore to fit the corresponding conical portion, means holding the bore of each element in tight holding relation with respect to the corresponding conical portion, and inter-engaging means on each conical portion and the element associated therewith uniformly distributed around the axis of the shaft to permit angular adjustment of the latter relatively to the element.

GABRIEL C. BEATRICE.

REFERENCES CITED

The following references are of record in the file of this patent:

UNITED STATES PATENTS

| Number | Name | Date |
| --- | --- | --- |
| 503,470 | Emery | Aug. 15, 1893 |
| 1,407,568 | Page | Feb. 21, 1922 |
| 1,612,112 | Gordon | Dec. 28, 1926 |
| 1,722,831 | Wattie | July 30, 1929 |

FOREIGN PATENTS

| Number | Country | Date |
| --- | --- | --- |
| 16,653 | Great Britain | of 1908 |